Figure 1A:
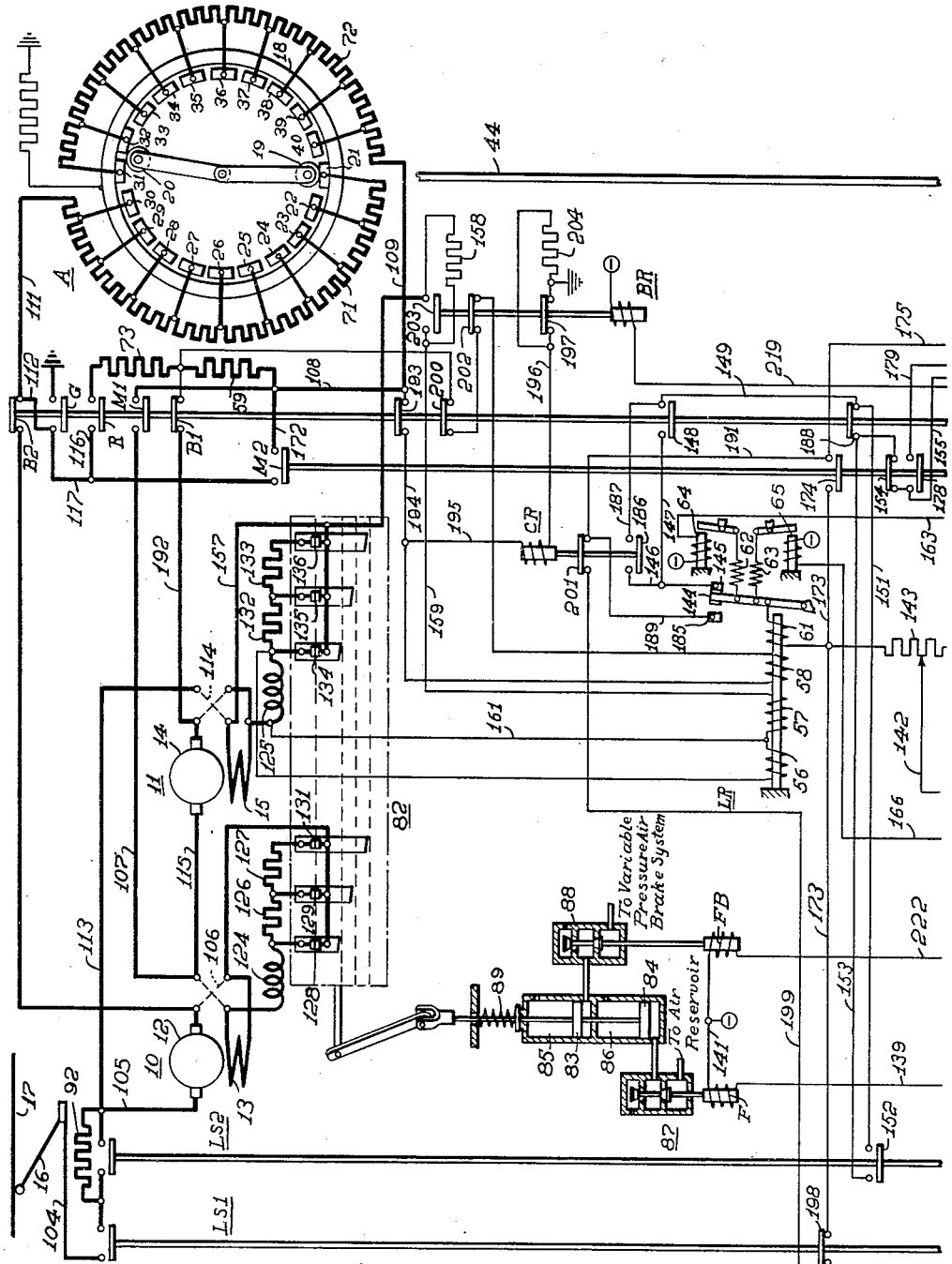

Sept. 2, 1941.　　　　　L. G. RILEY　　　　　2,254,911
MOTOR CONTROL AND BRAKE SYSTEM
Filed May 16, 1939　　　2 Sheets-Sheet 1

WITNESSES:
Edward Michaels

INVENTOR
Lynn G. Riley.
BY
ATTORNEY

Sept. 2, 1941.	L. G. RILEY	2,254,911
MOTOR CONTROL AND BRAKE SYSTEM
Filed May 16, 1939	2 Sheets-Sheet 2
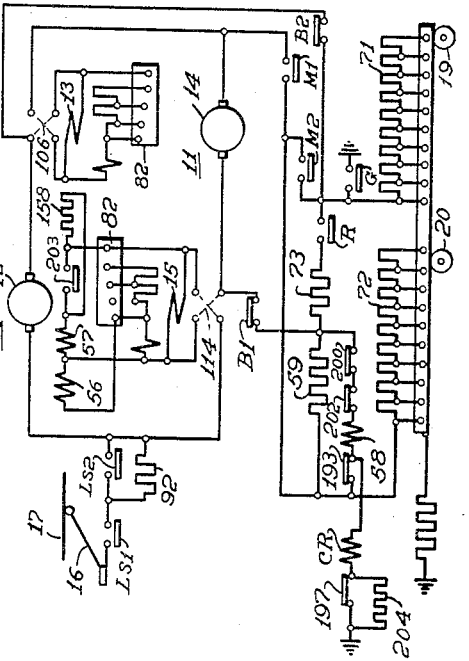
Fig. 2.
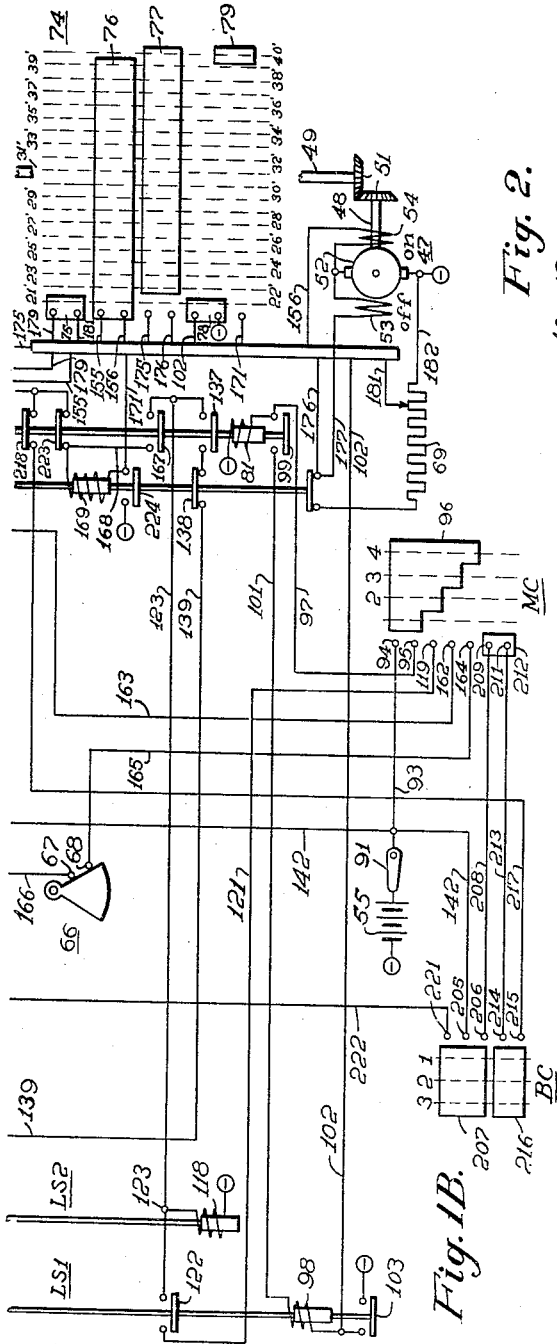
Fig. 1B.
Fig. 3.
WITNESSES:
Edward Michaels
INVENTOR
Lynn G. Riley.
BY
ATTORNEY Patented Sept. 2, 1941

2,254,911

UNITED STATES PATENT OFFICE 2,254,911

MOTOR CONTROL AND BRAKE SYSTEM

Lynn G. Riley, Pittsburgh, Pa., assignor to Westinghouse Electric & Manufacturing Company, East Pittsburgh, Pa., a corporation of Pennsylvania Application May 16, 1939, Serial No. 273,876

14 Claims. (Cl. 192—2)

My invention relates, generally, to motor control systems, and, more particularly, to systems for automatically controlling the acceleration and the deceleration of the propelling motors of electric vehicles.

An object of my invention, generally stated, is to provide an automatic control system for an electrically-propelled vehicle which shall be simple and efficient in operation and which may be economically manufactured and installed.

A more specific object of my invention is to provide a simplified and improved control system of the type described in my Patent No. 2,078,684, issued April 27, 1937, and assigned to the Westinghouse Electric & Manufacturing Company, in which a motor driven accelerator is utilized to control the acceleration and the deceleration of an electrically-propelled vehicle.

Another object of my invention is to provide an accelerator control system in which the accelerator is connected in the same manner during both acceleration and deceleration of the vehicle.

A further object of my invention is to reduce the duty imposed on the accelerator during the motoring operation of the vehicle.

Still another object of my invention is to increase the motor stability during both power and dynamic braking service.

A still further object of my invention is to coordinate the electrical brake and the air-brake systems of an electrically-propelled vehicle.

Another object of my invention is to limit the maximum rate of acceleration of an electrically-propelled vehicle.

A further object of my invention is to provide a motor control system suitable for application on cars which are connected together in multiple-unit trains.

Other objects of my invention will be explained fully hereinafter or will be apparent to those skilled in the art.

In accordance with one embodiment of my invention, both the acceleration and the deceleration of an electrically-propelled vehicle are primarily controlled by a motor driven accelerator of the type described in my Patent No. 1,991,229 issued February 12, 1935, and assigned to the Westinghouse Electric & Manufacturing Company. In general, the accelerator is controlled in the manner described in my aforementioned Patent No. 2,078,684. However, in the present system methods have been devised for simplifying and improving the operation which will be described fully hereinafter.

For a fuller understanding of the nature and objects of my invention, reference may be had to the following detailed description, taken in conjunction with the accompanying drawings, in which:

Figures 1A and 1B, when combined, constitute a diagrammatic view of a control system embodying my invention;

Fig. 2 is a schematic diagram showing the main circuit connections for the motors and control apparatus; and Fig. 3 is a chart, showing the sequence of operation of a portion of the apparatus illustrated in Figs. 1A and 1B.

Referring to the drawings, a pair of electric motors 10 and 11 may be utilized for propelling a vehicle (not shown). The motor 10 is provided with an armature winding 12 and a series field winding 13. Likewise, the motor 11 is provided with an armature winding 14 and a series field winding 15. A line switch LS1 is provided for connecting the motors 10 and 11 to a trolley 16 which engages a power conductor 17 that may be energized from any suitable source of power, such as a generating station (not shown).

The motors 10 and 11 are connected in parallel-circuit relation during acceleration of the vehicle and they may also be connected for dynamic braking with the field winding 15 of motor 11 connected across the armature 12 of motor 10 and the field winding 13 of motor 10 connected across the armature 13 of motor 11, thereby permitting the current in the armature windings to reverse and cause the motors to act as generators and decelerate the vehicle. A pair of switches B1 and B2 are provided for establishing the dynamic braking connections.

Both the acceleration and the deceleration of the motors 10 and 11 are primarily controlled by a motor driven accelerator A which is of the same general type as the one described in my aforementioned Patent No. 1,991,229. The accelerator A comprises a circular bus 18 inside of which are disposed a plurality of contact fingers 21 to 40, inclusive, which are progressively forced against the bus 18 by a pair of revolving rollers 19 and 20.

The rollers 19 and 20 are driven by a pilot motor 47 through shafts 48 and 49 connected by bevelled gears 51. The pilot motor 47 is provided with an armature winding 52 and two field windings 53 and 54, one for each direction of rotation of the motor 47. An electrical braking circuit which is fully described in Patent No. 2,078,649, issued April 27, 1937, to N. H. Willby and assigned to the Westinghouse Electric & Manufacturing Company is provided for quick stopping of the pilot motor 47 when it is deenergized. A battery 55 is provided for energizing the pilot motor 47 as well as furnishing the energy for operating the control apparatus utilized in the control system.

A limit relay LR is provided for controlling the operation of the pilot motor 47 during both acceleration and deceleration of the vehicle. As shown, the relay LR is provided with several different actuating coils which function to operate the relay during coasting of the vehicle as well as during acceleration and dynamic braking. Thus, coils 56 and 57 are connected across the field winding 15 of the motor 11 and energized during both the acceleration and braking of the vehicle and the spotting coil 58 is connected across a resistor 59 to be energized in accordance with the motor current during coasting of the vehicle, thereby providing means of spotting the accelerator A, as will be described more fully hereinafter. The relay LR is also provided with a tickler coil 61 which functions to cause a vibratory action of the relay in a manner well known in the art.

In order to provide for changing the setting of the relay LR, thereby governing the rate of acceleration of the vehicle by varying the speed of the pilot motor 47, which, in turn, controls the rate at which resistance is shunted from the motor circuit to vary the motor current, electro-mechanical means comprising a pair of springs 62 and 63 and a pair of electro-magnets 64 and 65 for tightening the springs 62 and 63, respectively, are provided.

The energization of the electro-magnets 64 and 65 is controlled by a manually operable master controller MC, thereby permitting the operator to vary the rate of acceleration of the vehicle as desired. However, the maximum rate of acceleration is governed by a retardation controller 66 which is an inertia or pendulum device that responds to acceleration and deceleration impulses and is provided with contact members 67 and 68 which are connected in the energizing circuit for the electro-magnet 65. Thus, this circuit is deenergized in case the vehicle is accelerated above a predetermined rate and the spring 63 is not effective to increase the current required to operate the relay LR, thereby lowering the rate of acceleration of the vehicle. A resistor 69 is also provided for speed control of the pilot motor 47.

The accelerator A is provided with resistors 71 and 72 for controlling the current in the motors 10 and 11. The resistor 71 is divided into a number of subdivisions which are connected to the contact fingers 21 to 30 inclusive, and the resistor 72 is divided into subdivisions which are connected to the contact fingers 31 to 40, inclusive. In the present system the resistors 71 and 72 are connected in the motor circuit in series-circuit relation during both acceleration and dynamic braking, thereby making it unnecessary to change the resistor connections when transferring from a motoring to a braking operation.

In order to reduce the duty imposed upon the accelerator during motoring, the resistor 59 and a resistor 73 are connected in the motor circuit in parallel-circuit relation with the resistors 71 and 72 during the motoring operation. Since part of the motor current is thereby diverted through the resistor 73, the heating effect on the accelerator is reduced and also, arcing of the contact fingers on the accelerator is reduced.

As shown, the accelerator A is provided with a drum switch 74 having a plurality of contact segments 75 to 79, inclusive, and cooperating contact fingers which engage the contact segments as the accelerator is driven by the shaft 49. The reference numerals 21' to 40' indicate the contact fingers over which the rollers 19 and 20 travel while the contact segments are engaged by their respective contact fingers. The function of the different segments of the drum switch 74 will be explained more fully hereinafter.

In addition to the accelerator and the control switches previously mentioned, numerous other switches are provided and perform certain switching operations. This includes a switch M1 for connecting the motors to the accelerator during acceleration of the vehicle, a switch G for connecting the accelerator resistors to ground during acceleration, a switch M2 for connecting the motors directly to ground through the switch G after the accelerator resistors have been shunted from the motor circuits by the accelerator rollers, and a switch R for connecting the resistors 59 and 73 in the motor circuit, as previously described, during acceleration. It will be noted that the switches B1 and B2 and the switches M1, G and R are all disposed on the same shaft which is operated by an actuating coil 81. Thus, when the coil 81 is energized, the switches M1, G, and R are closed, and the switches B1 and B2 are closed when the actuating coil 81 is deenergized. In this manner the number of contactors and protective interlocks required in the system is materially reduced.

In order to permit the present system to be utilized on cars which are operated in multiple-unit trains and controlled from one control station at the head of the train, a braking relay BR is provided, which permits dynamic braking to be established simultaneously on all the cars of a train. The energization of the relay BR is controlled by a brake controller BC which may also be utilized to control the air-brake system (not shown). Thus, when the braking controller at the head of the train is operated, all of the relays BR throughout the train are energized to permit dynamic braking to be established on all the motors in the train. The controllers MC and BC are electrically interlocked to prevent improper operation of the equipment.

With a view to providing smoother operation of multiple-unit trains when power is reapplied to the motors in the train after a stop has been made by means of dynamic braking, a coasting relay CR is provided. The actuating coil of the relay CR is energized only during spotting or braking of the train and the relay functions to prevent the accelerator from starting to advance while the train is standing still, since the coil of the relay CR is responsive to the counter E. M. F. of a motor.

It has been found that in multiple-unit trains the accelerators may start spotting as a result of the operation of the limit relay LR if the operator moves the braking controller to the "off" position while the train is standing still. Thus, when power is reapplied to the motors by operating the master controller, the accelerators may not all be in the correct position for the reapplication of power, thereby resulting in rough or uneven operation of the train. Since the relay CR is responsive to the motor speed, its contact members are so connected in the motor circuit that the advancement of the accelerator is prevented while the train is standing still.

In order that the field windings of the motors 10 and 11 may be shunted during both motoring and braking operations, a pneumatically operated field shunting switch 82 is provided. The switch 82 is operated by pistons 83 and 84 disposed in cylinders 85 and 86, respectively. As shown, the cylinder 86 is connected by means of a magnet valve 87 to an air reservoir in which a substantially constant pressure is maintained, as is the usual practice on railway vehicles. The cylinder 85 is connected by means of a magnet valve 88 to the variable pressure air-brake system of the vehicle. The movement of the pistons 83 and 84 is opposed by a spring 89. Thus, when the actuating coil F of the magnet valve 87 is energized to admit a constant fluid pressure to the cylinder 86, the piston 84 is actuated against the pressure of the spring 89 to operate the field shunting switch 82 at a predetermined rate of movement, thereby removing the shunt from the field windings 13 and 15 in predetermined steps and increasing motor stability.

However, when the actuating coil FB of the magnet valve 88 is energized during dynamic braking the cylinder 85 is connected through the magnet valve 88 to the variable pressure air-brake system and the rate of movement of the field shunting switch 82 is governed by the pressure in the brake system. Thus, it will be seen that the switch 82 is operated either rapidly or slowly depending upon the brake pressure, which in turn, is controlled by the operator of the vehicle in the usual manner.

As described in my prior Patent 2,078,684, the dynamic braking effect produced by the motors 10 and 11 may be governed by the shunting of the fields 13 and 15. Thus with full field strength, maximum braking effect is produced and with a weaker field, the braking effect is decreased. Since the maximum effect of the air-brake system is obtained by supplying maximum air pressure to the braking system, it will be seen that the maximum effect of the electrical or dynamic braking system is likewise obtained as a result of the application of maximum air pressure to the braking system. In this manner, the electrical or dynamic braking system is coordinated with the air-brake system and both systems are under the control of the operator at all times.

In order that the functioning of the foregoing apparatus may be more clearly understood, the operation of the system will now be described in more detail.

Assuming that a control switch 91 has been closed to connect the battery 55 in the control system, and that it is desired to accelerate the vehicle at the maximum rate, the master controller MC is actuated to position "4," thereby applying power to the motors 10 and 11. When the controller MC is actuated to the "switching" position, the switches M1, G, R, and LS1 are closed to connect the motors 10 and 11 to the power source through a resistor 92 and the resistors 71 and 72 in the accelerator A. The energizing circuit for the actuating coil of the switches M1, G, and R may be traced from the battery 55 through the switch 91, a conductor 93, contact fingers 94 and 95, bridged by a segment 96 on the controller MC, conductor 97, and the actuating coil 81 to negative.

Following the closing of the switch M1, the actuating coil 98 of the switch LS1 is energized through a circuit which extends from the previously energized conductor 97 through an interlock 99 on the switch M1, a conductor 101, the coil 98, conductor 102, and the contact segment 76 on the drum switch 74 to negative. Thus, it will be seen that it is necessary for the accelerator A to be in its initial position before the switch LS1 can be closed. A holding circuit is established for the switch LS1, through the actuating coil 98, and an interlock 103 on the switch LS1 to negative, thereby holding the switch closed after the accelerator has moved from its initial position.

As explained hereinbefore, the switches G and R are closed simultaneously with the switch M1 by the energization of the actuating coil 81. The closing of the switches M1, G, R, and LS1 connects the motors 10 and 11 in parallel-circuit relation. The circuit through the motor 10 may be traced from the power conductor 17, through the trolley 16, a conductor 104, the switch LS1, the resistor 92, conductor 105, the armature 12 of the motor 10, a reversing switch 106, the field winding 13, the reversing switch 106, a conductor 107, the switch M1, conductors 108 and 109, the resistor 72, the contact fingers 31, the bus 18, the contact fingers 21, the resistor 71, conductors 111 and 112, and a switch G to ground. The circuit through the motor 11 extends from the conductor 105, through a conductor 113, a reversing switch 114, the field winding 15, the reversing switch 114, the armature 14, a conductor 115, and thence through the switch M1, the accelerator A and the switch G, to ground through a circuit previously traced.

As explained hereinbefore, the resistors 59 and 73 are connected in the motor circuit in parallel-circuit relation with the resistors of the accelerator A during the motoring operation, thereby reducing the duty imposed upon the accelerator and also making it possible to connect the resistors 71 and 72 of the accelerator in series-circuit relation during motoring as well as during dynamic braking, which simplifies the switching operations necessary to establish dynamic braking of the motors. The parallel circuit through the resistors 59 and 73 extends from the conductor 108, through the resistors 59 and 73, the switch R, conductors 116 and 117 and thence through the switch G to ground.

Following the closing of the switch LS1, a switch LS2 is closed by the energization of its actuating coil 118 through a circuit which may be traced from a contact finger 119, which engages the contact segment 96 of the controller MC, through conductor 121 and interlock 122 on the switch LS1, conductor 123, and the coil 118 to negative. The closing of the switch LS2 shunts the resistor 92 from the motor circuit, thereby increasing the current supplied to the motors in the usual manner.

It will be noted that the field windings 13 and 15 of the motors 10 and 11 are shunted through the field shunting reactors 124 and 125, when power is first applied to the motors. Since the field shunting switch 82 is in the position shown in the drawings, the field shunting resistors 126 and 127 are short circuited by contact members 128, 129, and 131, and resistors 132 and 133 are short circuited by contact members 134, 135, and 136 of the field shunting switch 82.

Following the closing of the switches LS1 and M1 the magnet valve 87 is energized to admit air to the cylinder 86, thereby causing the piston 84 to operate the field shunting switch 82 to remove the shunting circuit from the field windings 13 and 15. The energizing circuit for the magnet valve 87 may be traced from a contact finger 119 of the controller MC through conductor 121, an interlock 122, conductor 123, an interlock 137 on the switch M1, an interlock 138 on the switch M2, conductor 139, the actuating coil F of the magnet valve 87 and conductor 141 to negative.

In this manner fluid pressure is admitted to the cylinder 86, thereby operating the field shunting switch 82 to insert the resistors 126 and 127 in the field shunting circuit step-by-step, and then finally completely opening the field shunting circuit by the opening of the contact members 128, thereby applying maximum field strength to the motor 10. Likewise, full field is applied to the motor 11 by the opening of the switches 136, 135 and 134 in a step-by-step manner.

Further acceleration of the motor is controlled by the accelerator A which is driven by the pilot motor 47 under the control of the relay LR. The pilot motor 47 is energized at this time through a circuit which may be traced from the battery 55 through the switch 91, conductor 142, a resistor 143, the tickler coil 61, contact members 144 and 145 of the limit relay LR, conductors 146 and 147, an interlock 148 on the switch M1, conductors 149 and 151, an interlock 152 on the switch LS2, conductor 153, an interlock 154 on the switch M2, conductor 155, the contact 76 of the drum switch 74, conductor 156, the field winding 54 of the motor 47, and the armature winding 52 to negative.

As explained hereinbefore, the pilot motor 47 advances the accelerator A under the control of the limit relay LR, the operation of which is governed by the motor current. The coil 57 of the relay LR is connected across the series field winding 15 of the motor 11 and is, therefore, responsive to the drop across the field winding 15, which in turn depends upon the current flowing through the field winding. The circuit through the coil 57 may be traced from one terminal of the field winding 15 through conductor 157, a resistor 158, conductor 159, the coil 57, and conductor 161 to the other terminal of the field winding 15.

It will be noted that the tickler coil 61 is deenergized when the contact members 144 and 145 of the limit relay LR are opened as a result of the energization of the coils 57 and 61 by a predetermined current. Thus, the coil 61 is deenergized, which permits the contact members 144 and 145 to reclose, thereby establishing a vibratory action of the relay LR, the rate of vibration depending upon the current in the coil 57 which, as explained hereinbefore, is responsive to the motor current. In this manner, the speed of the pilot motor 47 is governed to control the shunting of the resistors 71 and 72 from the motor circuit, thereby controlling the rate of acceleration of the motors 10 and 11.

Since it has been assumed that the master controller MC is actuated to position "4," both of the electro-magnets 64 and 65 are energized to apply tension to the springs 62 and 63 respectively, thereby increasing the current required to operate the relay LR, which in turn, increases the current supplied to the motors 10 and 11 to increase the rate of acceleration. The energizing circuit for the electro-magnet 64 may be traced from a contact finger 162 on the controller MC through a conductor 163 and the coil of the magnet 64 to negative. The circuit for the electro-magnet 65 extends from a contact finger 164 on the controller MC through a conductor 165, contact members 67 and 68 bridged by the pendulum device 66, conductor 166, and the coil 65 to negative.

As explained hereinbefore, the pendulum device 66 functions to limit the maximum rate of acceleration of the vehicle. Thus, if the vehicle is accelerated above a predetermined rate, the device 66 opens the circuit through the contact members 67 and 68 and deenergizes the electromagnet 65, which in turn reduces the tension applied to the spring 63 and decreases the current required to operate the limit relay LR, thereby reducing the rate of acceleration of the motors, as explained hereinbefore.

When the accelerator A nears the end of its travel in the forward direction, the switch M2 is closed to connect the motors 10 and 11 directly to ground. The energizing circuit for the actuating coil of the switch M2 may be traced from the previously energized conductor 123 through an interlock 167 on the switch M1, conductor 168, the actuating coil 169 of the switch M2, conductor 171, and the segment 79 of drum switch 74 to negative.

The closing of the switch M2 connects the motors 10 and 11 directly to ground through a circuit which extends from the conductor 108, through conductor 172, the switch M2, conductor 117, and switch G to ground. The closing of the switch M2 also opens the interlock 154 on this switch to deenergize the pilot motor 47 which causes the accelerator to stop.

Furthermore, the closing of the switch M2 energizes the "off" field 53 of the pilot motor 47, thereby causing it to operate in the reverse direction to return the accelerator A to its initial position. The energizing circuit for the pilot motor 47 may be traced from the battery 55, through switch 91, conductor 142, the resistor 143, a conductor 173, an interlock 174 on the switch M2, conductor 175, the segment 77 of the drum switch 74, conductors 176 and 177, the "off" field 53 and the armature 52 of the pilot motor 47 to negative.

As the pilot motor approaches its initial position the motor is deenergized by the interruption of the circuit through the segment 77 of the drum switch 74. Furthermore, an electrical braking circuit is established for the motor to bring the motor to a quick stop at the end of its travel. The braking circuit may be traced from one terminal of the armature 52, through the field 54, conductor 156, the segment 76, conductor 155, an interlock 178 on the switch M2, conductor 179, the segment 75 of the drum switch 74, conductor 181, a portion of the resistor 69, and conductor 182 to the other terminal of the armature winding 52.

The closing of the switch M2 also deenergizes the actuating coil F of the magnet valve 87 by the opening of the interlock 138, thereby causing the field shunting switch 82 to be returned to the position shown in the drawings in which the field windings 13 and 15 of the motors 10 and 11 are shunted by the closing of the contact members on the field shunt switch, as explained hereinbefore. In this manner the motors are operated with a weak field to raise the maximum speed attained by the motors, in a manner well known in the art.

If it is desired to permit the vehicle to coast, the motors 10 and 11 may be disconnected from the power source by actuating the controller MC to the "off" position, thereby deenergizing the actuating coils for the switches M1, R, and G, and also the switch LS1. As explained hereinbefore, the switches B1 and B2 are closed when the actuating coil 81 is deenergized, thereby establishing the dynamic brake connections for the motors and permitting a small current to circulate through the motors during coasting of the vehicle, as described in my aforementioned Patent 2,078,684. However, the circulating current is of such a low value that it does not materially affect the coasting characteristics of the car.

As explained in my aforementioned patent, the closing of the switches B1 and B2 to establish dynamic braking connections immediately upon the actuation of the controller MC to the "off" position utilizes the relatively high voltage of the motors 10 and 11 which is available for a short time after power is shut off, to start the motors generating immediately, without the time lag previously required for the voltage of the machines to build up from the low residual voltage present after the machines have been disconnected from the power source for a considerable length of time while the vehicle has been coasting. However, the generated current is maintained at a low value by the action of the accelerator A, which is under the control of the limit relay LR during coasting, the relay LR being operated by the spotting coil 58 which is connected across the resistor 59 which is in the motor circuit at this time. The spotting coil 58 is designed to operate the relay at a relatively low value of current and the electro-magnets 64 and 65 are deenergized at this time to remove the tension from the springs 62 and 63. The spotting coil is connected across the resistor 59 through interlocks 193 and 200 on the switch M1 and contact members 202 of the relay BR.

Furthermore, the contact members of the field shunting switch 82 are all closed during coasting to weaken the field strength of the machines 10 and 11, thereby tending to maintain a low value of generated current. In this manner, the current of the machines is held at a relatively low value during coasting.

Since the current generated by the machines 10 and 11 during coasting is proportional to the speed of the car, this current may be utilized for spotting the accelerator A, that is, for matching the position of the accelerator with the speed of the vehicle, thereby ensuring that the accelerator will be in the proper position for the reapplication of power or for the utilization of dynamic braking to decelerate the car. As previously explained, the accelerator is under the control of the limit relay LR during coasting. The contact members of the limit relay are so connected in the circuit for the pilot motor that the motor may be operated in either direction depending upon the speed of the car. Thus, with the contact members 144 and 145 closed, the pilot motor advances the accelerator to decrease the resistance in the motor circuit until a point is reached at which the motor current is sufficient to operate the relay LR to open the contacts 144 and 145. Should the car decrease in speed which would result in lower motor current, the contact members 144 and 145 are closed to further advance the accelerator.

However, should the car increase in speed during coasting, resulting in a sufficient increase in the motor current to cause the contact member 144 to engage a contact member 135 of the limit relay, the pilot motor will be operated in the reverse direction to return the accelerator towards its initial position, thereby increasing the resistance in the motor circuit and matching the position of the accelerator with the speed of the car. The circuit for forward operation of the pilot motor may be traced from the battery 55 through switch 91, conductor 142, the resistor 143, the tickler coil 61, contact members 144 and 145 of the relay LR, conductor 146, contact members 186 on the relay CR, conductors 187 and 149, an interlock 188 on the switch M1, the interlock 154 on the switch M2, conductor 155, the segment 76, on the drum switch 74, conductor 156, the "on" field 54, and the armature 52 of the pilot motor to negative. The circuit for the reverse operation of the pilot motor extends from the contact member 144 of the limit relay LR through contact member 185, conductors 189, 191, and 175, the segment 77 of the switch 74, conductors 176 and 177, the "off" field 53, and the armature 52 to negative.

As explained hereinbefore, the relay CR is utilized to permit operation of the accelerator during coasting and braking, but to prevent its advancement while the vehicle is standing still. The operating coil for the relay CR is connected across one motor to ground, thereby being energized by the counter-electromotive force of the motor which is dependent upon the speed of rotation of the motor. The energizing circuit for the coil of the relay CR may be traced from one terminal of the armature 14 of the motor 11 through conductor 192, the switch B1, the resistor 59, conductor 108, an interlock 193 on the switch M1, conductors 194 and 195, the coil of the relay CR, conductor 196, and contact members 197 of the relay BR to ground.

Thus, it will be seen that while the vehicle is moving, the relay CR is energized to close its contact members 186, thereby permitting the limit relay LR to spot the accelerator in the manner herein described. However, when the vehicle is standing, the relay CR is deenergized and the circuit for the forward operation of the motor 47 is interrupted by the opening of the contact members 186 which prevents the accelerator from being advanced as a result of an operation of the relay LR which, of course, would normally operate to advance the accelerator since the motor current is below the setting of the spotting coil 58 of the relay. Furthermore, when the relay CR is deenergized, a circuit is established to operate the accelerator in the reverse direction to return it to its initial position. This circuit may be traced from the conductor 173, through an interlock 198 on the switch LS1, conductor 199, the contact members 201 on the relay CR and thence through a circuit previously traced to the pilot motor 47.

In the event that dynamic braking is required to decelerate the vehicle, the controller BC is actuated to one of the braking positions, thereby energizing the relay BR to disconnect the spotting coil 58 on the limit relay LR by opening the contact members 202 and also shunting the resistor 158 from the circuit for the coil 57 on the limit relay LR by closing contact members 203. In this manner the relay LR is recalibrated for proper operation during dynamic braking. The relay CR is also recalibrated by the opening of the contact members 197 on the relay BR to insert a resistor 204 in the circuit for the coil of the relay CR. The energizing circuit for the actuating coil of the relay BR may be traced from the battery 55 through the switch 91, conductor 142, contact fingers 205 and 206, bridged by a segment 207 of the controller BC, conductor 208, contact fingers 209 and 211, bridged by a segment 212 on the controller MC, conductor 213, contact fingers 214 and 215, bridged by a segment 216 on the controller BC, conductor 217, an interlock 218 on the switch M1, conductor 219, and the coil of the relay BR to negative.

The operation of the controller BC to one of the braking positions also establishes an energizing circuit for the coil FB of the magnet valve 88, thereby connecting the cylinder 85 to the variable pressure air-brake system, as hereinbefore described. In this manner, the field shunting switch 82 is operated to open the shunting circuits for the field windings 13 and 15 of the motors 10 and 11, thereby applying full field strength to the motors, to cause them to build up a dynamic braking current.

However, since the operation of the field shunting switch 82 is dependent upon the pressure applied to the piston 83, through the magnet valve 88, it will be seen that the rate at which the switch 82 is operated to remove the shunting circuits from the field windings of the motors is governed by the pressure in the air-brake system. Thus, if maximum braking effect is desired by the operator, in which event, he will operate the brake controller to provide maximum air pressure, a maximum field strength is quickly applied to the motors to produce the maximum dynamic brake effect. Likewise, if the air-brake pressure is reduced to reduce the effect of the air-brakes, the pressure in the cylinder 85 is also reduced which permits the switch 82 to be operated by the spring 89 to shunt the fields of the motors, thereby reducing the braking effect. The energizing circuit for the coil FB of the magnet valve 88 extends from a contact finger 221 on a controller BC, through conductor 222, the coil FB, and conductor 141 to negative. In this manner the air-brake system and the electrical or dynamic system are coordinated at all times and the total braking effect on the vehicle is under the control of the operator.

It will be noted that the switch M2 is closed in the event that the accelerator is fully advanced to shunt the resistors 71 and 72 from the motor circuit during dynamic braking, as was the case during acceleration of the vehicle. The energizing circuit for the actuating coil of the switch M2 extends from the previously energized conductor 219 through an interlock 223 on the switch M1, the coil 169 of the switch M2, and thence to negative at the drum switch 74, as previously traced. A holding circuit is established for the switch M2 which extends from one terminal of the coil 169 through an interlock 224 on the switch M2 to negative. In this manner, the switch M2 is closed to shunt the resistors 71 and 72 from the motor circuit, thereby permitting the accelerator to be returned to its original position in order that it will be in the correct position to permit power to be reapplied to the motors.

From the foregoing description, it is apparent that I have provided a control system which will cause the propelling motors of an electric vehicle to be accelerated rapidly and smoothly. It is also evident that I have provided for smoothly and effectively decelerating a vehicle by coordinating the air-brake system and the electrical brake system of the vehicle. Furthermore, the system herein disclosed is particularly suitable for application on electrically propelled cars which are operated in multiple-unit trains. However, it is not limited in its application to such vehicles, but may be utilized on vehicles which are operated as individual units.

Since many modifications may be made in the apparatus and arrangement of parts without departing from the spirit of my invention, I do not wish to be limited other than by the scope of the appended claims.

I claim as my invention:

1. In a motor control system, in combination, a motor for propelling a vehicle, a power conductor, switching means for connecting the motor to the power conductor, switching means for establishing dynamic braking connections for the motor, a variable resistance accelerator for controlling the motor current during acceleration and dynamic braking of the vehicle, said accelerator being connected in the motor circuit in the same manner during both acceleration and dynamic braking, means for driving said accelerator in the same direction during both acceleration and dynamic braking of the vehicle to vary the resistance in the motor circuit, and switching means controlled by said accelerator for shunting the accelerator from the motor circuit.

2. In a motor control system, in combination, a motor for propelling a vehicle, a power conductor, switching means for connecting the motor to the power conductor, switching means for establishing dynamic braking connections for the motor, a variable resistance accelerator for controlling the motor current during acceleration and dynamic braking of the vehicle, said accelerator being connected in the motor circuit in the same manner during both acceleration and dynamic braking, and a fixed resistance connected in parallel-circuit relation to the variable resistance accelerator while power is being applied to the motor.

3. In a motor control system, in combination, a motor for propelling a vehicle, a power conductor, switching means for connecting the motor to the power conductor and for establishing dynamic braking connections for the motor, a variable resistance accelerator for controlling the motor current during acceleration and dynamic braking of the vehicle, said accelerator comprising two resistors connected in series-circuit relation in the motor circuit during both acceleration and dynamic braking, means for operating said accelerator in the same direction during both acceleration and dynamic braking of the vehicle to vary the resistance in the motor circuit, and switching means controlled by said accelerator for shunting the resistors of the accelerator from the motor circuit.

4. In a motor control system, in combination, a motor for propelling a vehicle, a power conductor, switching means for connecting the motor to the power conductor and for establishing dynamic braking connections for the motor, a variable resistance accelerator for controlling the motor current during acceleration and dynamic braking of the vehicle, said accelerator comprising two resistors connected in series-circuit relation in the motor circuit during both acceleration and dynamic braking, means for operating said accelerator in the same direction during both acceleration and dynamic braking of the vehicle to vary the resistance in the motor circuit, and a fixed resistance connected in parallel-circuit relation to the variable resistance accelerator while power is being applied to the motor.

5. In a motor control system, in combination, a motor for propelling a vehicle, a power conductor, switching means for connecting the motor to the power conductor to accelerate the vehicle, a controller for controlling the motor current during the acceleration of the vehicle, means for operating said controller, relay means responsive to the motor current for controlling said operating means, spring means for adjusting said relay means, electromagnetic means for varying said spring means, and a master controller for controlling the energization of said electro-magnetic means.

6. In a motor control system, in combination, a motor for propelling a vehicle, a power conductor, switching means for connecting the motor to the power conductor to accelerate the vehicle, a controller for controlling the motor current during the acceleration of the vehicle, means for operating said controller, relay means responsive to the motor current for controlling said operating means, electro-mechanical means for adjusting said relay means, a master controller for controlling the energization of said electro-mechanical means, and means responsive to the rate of acceleration of the vehicle cooperating with the master controller to control the energization of said electro-mechanical means.

7. In a motor control system, in combination, a motor for propelling a vehicle, a power conductor, switching means for connecting the motor to the power conductor to accelerate the vehicle, a controller for controlling the motor current during the acceleration of the vehicle, means for operating said controller, relay means responsive to the motor current for controlling said operating means, electro-mechanical means for adjusting said relay means, a master controller for controlling the energization of said electro-mechanical means, and means responsive to the rate of acceleration of the vehicle for making a portion of the electro-mechanical means ineffective.

8. In a motor control system, in combination, a motor for propelling a vehicle, said motor having an armature winding and a field winding, a power conductor, switching means for connecting the motor to the power conductor and for establishing dynamic braking connections for the motor, control means for controlling the operation of said switching means, variable means for shunting the field winding of the motor during dynamic braking to vary the braking effect, variable pressure means for operating the field shunting means, a controller for controlling the resistance in the motor circuit during both acceleration and dynamic braking, and means responsive to the motor current for controlling the operation of said controller.

9. In a motor control system, in combination, a motor for propelling a vehicle, said motor having an armature winding and a field winding, a power conductor switching means for connecting the motor to the power conductor and for establishing dynamic braking connections for the motor, control means for controlling the operation of said switching means, variable means for shunting the field winding of the motor during dynamic braking to vary the braking effect, variable pressure means for operating the field shunting means, said variable pressure means being connected to the air-brake system of the vehicle, thereby coordinating the electrical brake and the air-brake systems, a controller for controlling the resistance in the motor circuit during both acceleration and dynamic braking, and means responsive to the motor current for controlling the operation of said controller.

10. In a motor control system, in combination, a motor for propelling a vehicle, said motor having an armature winding and a field winding, a power conductor, switching means for connecting the motor to the power conductor and for establishing dynamic braking connections for the motor, control means for controlling the operation of said switching means, variable means for shunting the field winding of the motor during dynamic braking to vary the braking effect, variable pressure means for operating the field shunting means, and an electro-pneumatic valve for connecting said variable pressure means to the air-brake system of the vehicle, thereby coordinating the electrical brake and the air-brake systems.

11. In a motor control system, in combination, a motor for propelling a vehicle, said motor having an armature winding and a field winding, a power conductor, switching means for connecting the motor to the power conductor and for establishing dynamic braking connections for the motor, control means for controlling the operation of said switching means, variable means for shunting the field winding of the motor during dynamic braking to vary the braking effect, and variable pressure means for operating the field shunting means, and an electro-pneumatic valve for connecting said variable pressure means to the air-brake system of the vehicle, thereby coordinating the electrical brake and the air-brake systems, the operation of said electro-pneumatic valve being controlled by said control means.

12. In a motor control system, in combination, a motor for propelling a vehicle, switching means for establishing dynamic braking connections for the motor, said braking connections being established during coasting of the vehicle, a controller for controlling the resistance in the motor circuit, means responsive to the motor current for controlling the operation of said controller, and means responsive to the motor speed for preventing advancement of said controller while the vehicle is standing still.

13. In a motor control system, in combination, a motor for propelling a vehicle, switching means for establishing dynamic braking connections for the motor, said braking connections being established during coasting of the vehicle, a controller for controlling the resistance in the motor circuit, relay means responsive to the motor current for controlling the operation of said controller, and additional relay means responsive to the motor speed and cooperating with said first-named relay means to control the operation of said controller during coasting and dynamic braking of the vehicle.

14. In a motor control system, in combination, a motor for propelling a vehicle, switching means for establishing dynamic braking connections for the motor, said braking connections being established during coasting of the vehicle, a controller for controlling the resistance in the motor circuit, relay means responsive to the motor current for controlling the position of said controller during coasting of the vehicle, and additional relay means responsive to the motor voltage for preventing advancement of the controller while the vehicle is standing still.

LYNN G. RILEY.